US012586846B2

(12) United States Patent
Yong et al.

(10) Patent No.: US 12,586,846 B2
(45) Date of Patent: Mar. 24, 2026

(54) SECONDARY BATTERY

(71) Applicant: Samsung SDI Co., Ltd., Yongin-si (KR)

(72) Inventors: Jun Sun Yong, Yongin-si (KR); Hyun Soo Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 485 days.

(21) Appl. No.: 18/153,953

(22) Filed: Jan. 12, 2023

(65) Prior Publication Data

US 2023/0231237 A1 Jul. 20, 2023

(30) Foreign Application Priority Data

Jan. 17, 2022 (KR) ........................ 10-2022-0006822

(51) Int. Cl.
| | |
|---|---|
| *H01M 50/121* | (2021.01) |
| *H01M 50/103* | (2021.01) |
| *H01M 50/169* | (2021.01) |
| *H01M 10/659* | (2014.01) |
| *H01M 50/14* | (2021.01) |
| *H01M 50/176* | (2021.01) |
| *H01M 50/536* | (2021.01) |
| *H01M 50/59* | (2021.01) |
| *H01M 50/593* | (2021.01) |

(52) U.S. Cl.
CPC ....... *H01M 50/121* (2021.01); *H01M 50/103* (2021.01); *H01M 50/169* (2021.01); *H01M 10/659* (2015.04); *H01M 50/14* (2021.01); *H01M 50/176* (2021.01); *H01M 50/536* (2021.01); *H01M 50/59* (2021.01); *H01M 50/593* (2021.01)

(58) Field of Classification Search
CPC .. H01M 50/103; H01M 50/121; H01M 50/14; H01M 50/169; H01M 50/176; H01M 50/536; H01M 50/59; H01M 50/593–10/658
USPC ......................................................... 429/179
See application file for complete search history.

(56) References Cited

U.S. PATENT DOCUMENTS

| | | | | |
|---|---|---|---|---|
| 10,651,499 B2* | 5/2020 | Seong | ............... | H01M 10/0525 |
| 2012/0052341 A1* | 3/2012 | Kim | .................... | H01M 50/147 |
| | | | | 429/186 |
| 2016/0141589 A1* | 5/2016 | Kang | .................... | H01M 50/46 |
| | | | | 429/211 |

(Continued)

FOREIGN PATENT DOCUMENTS

| | | | |
|---|---|---|---|
| EP | 3 451 416 A1 | | 3/2019 |
| JP | 2018200755 A | * | 12/2018 |

(Continued)

OTHER PUBLICATIONS

Extended European Search Report issued in corresponding EP Application No. 23151507.3, dated May 10, 2023, 7 pages.

*Primary Examiner* — Brian K Talbot
(74) *Attorney, Agent, or Firm* — Womble Bond Dickinson (US) LLP

(57) ABSTRACT

A secondary battery includes: an electrode assembly having a long side and a short side; a retainer coupled to the short side of the electrode assembly; an insulating sheet surrounding a periphery of the electrode assembly and the retainer; and a case accommodating the electrode assembly, the retainer, and the insulating sheet.

12 Claims, 5 Drawing Sheets

(56)                    References Cited

U.S. PATENT DOCUMENTS

| | | | |
|---|---|---|---|
| 2019/0067665 A1* | 2/2019 | Jang .................... | H01M 50/538 |
| 2020/0127348 A1 | 4/2020 | Unno | |
| 2020/0295339 A1* | 9/2020 | Kwak ............... | H01M 10/0436 |
| 2021/0043910 A1 | 2/2021 | Shin et al. | |
| 2022/0302564 A1* | 9/2022 | Shin ..................... | H01M 4/525 |

FOREIGN PATENT DOCUMENTS

| | | | | |
|---|---|---|---|---|
| JP | 2020-68052 | A | 4/2020 | |
| KR | 101684347 | B1 * | 12/2016 | ........ H01M 10/0431 |
| KR | 10-2019-0104684 | A | 9/2019 | |
| KR | 10-2020-0100408 | A | 8/2020 | |

* cited by examiner

SECONDARY BATTERY

CROSS-REFERENCE TO RELATED APPLICATION

This application claims priority to and the benefit of Korean Patent Application No. 10-2022-0006822, filed on Jan. 17, 2022, in the Korean Intellectual Property Office, the entire content of which is herein incorporated by reference.

BACKGROUND

1. Field

Aspects of embodiments of the present disclosure relate to a secondary battery.

2. Description of the Related Art

A secondary battery is manufactured in various shapes, and typical examples thereof include a cylindrical shape and a square shape. The secondary battery may be manufactured by installing, in a case, an electrode assembly formed with a separator as an insulator interposed between positive and negative plates and an electrolyte, and installing a cap assembly in the case. The electrode assembly is electrically connected to an electrode terminal through a current collector plate. The internal volume of the case varies according to the structure of the current collector plate.

SUMMARY

A capacity of a secondary battery may be increased by decreasing the size of the current collector plate within a same case size. Further, according to embodiments of the present disclosure, a secondary battery is provided that is not damaged when an electrode assembly is coupled.

According to an embodiment of the present disclosure, a secondary battery includes: an electrode assembly having a long side and a short side; a retainer coupled to the short side of the electrode assembly; an insulating sheet surrounding a periphery of the electrode assembly and the retainer; and a case accommodating the electrode assembly, the retainer, and the insulating sheet.

The insulating sheet may have an adhesive on an inner surface thereof, and the insulating sheet may be coupled to the electrode assembly and the retainer by the adhesive.

A width of the retainer may not be less than 1 mm smaller than a width of the short side of the electrode assembly.

The retainer and the insulating sheet may be made of an electrically insulating material.

The insulating sheet may include polypropylene (PP).

The insulating sheet may include at least one of polypropylene (PP) and polyimide (PI).

The insulating sheet may have a seating portion and wing portions on both sides of the seating portion, one surface of the long side of the electrode assembly may be attached to the seating portion of the insulating sheet, and the wing portions may be bent from the seating portion to cover the short side of the electrode assembly and the retainer.

The wing portions of the insulating sheet may extend over another surface of the long side of the electrode assembly to cover the other surface of the long side.

The secondary battery may further include a pair of cap assemblies that are electrically coupled to both ends of the electrode assembly and coupled through both sides of the case.

Boundaries of the case and the cap assemblies may be welded to each other.

DETAILED DESCRIPTION

Figure 1:
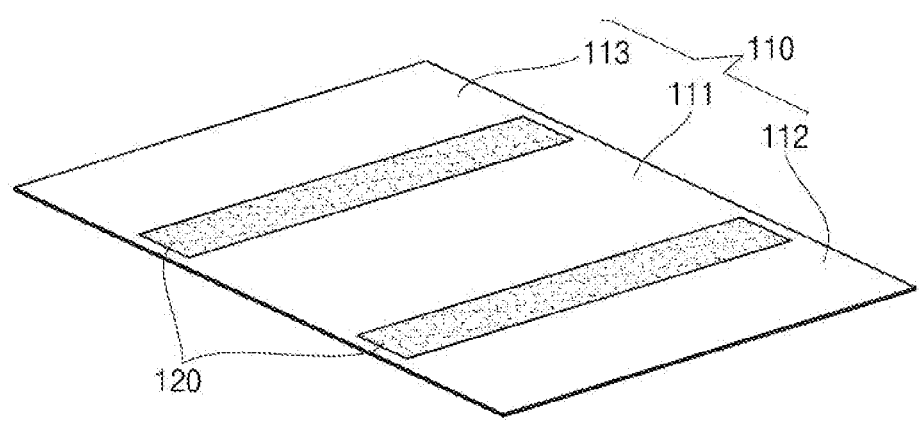
FIG. 1 illustrates an insulating sheet with a retainer according to an embodiment of the present disclosure.

Hereinafter, embodiments of the present disclosure will be described, in detail, with reference to the accompanying drawings.

Embodiments of the present disclosure are provided to more completely explain the present disclosure to those skilled in the art, and the following embodiments may be modified in various other forms. The present disclosure, however, may be embodied in many different forms and should not be construed as being limited to the embodiments set forth herein. Rather, these embodiments are provided so that this disclosure will be thorough and complete and will convey the aspects and features of the present disclosure to those skilled in the art.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements.

In the figures, dimensions of the various elements, layers, etc. may be exaggerated for clarity of illustration. The same reference numerals designate the same elements. As used herein, the term "and/or" includes any and all combinations of one or more of the associated listed items. Further, the use of "may" when describing embodiments of the present disclosure relates to "one or more embodiments of the present disclosure." Expressions, such as "at least one of," when preceding a list of elements, modify the entire list of elements and do not modify the individual elements of the list. As used herein, the terms "use," "using," and "used" may be considered synonymous with the terms "utilize," "utilizing," and "utilized," respectively. As used herein, the terms "substantially," "about," and similar terms are used as terms of approximation and not as terms of degree, and are intended to account for the inherent variations in measured or calculated values that would be recognized by those of ordinary skill in the art.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing embodiments of the present disclosure and is not intended to be limiting of the present disclosure. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

Hereinafter, a structure of a secondary battery according to embodiments of the present disclosure and a manufacturing process thereof will be described in detail.

FIG. 1 illustrates an insulating sheet used for a secondary battery according to an embodiment of the present disclosure.

The insulating sheet 110 is made of an electrically insulating material and may be composed of a single or multiple (or a plurality of) layers. The insulating sheet 110 may cover side surfaces of the electrode assembly to prevent the electrode assembly from coming into contact with the case and causing an electrical short. The insulating sheet 110 may include, for example, polypropylene (PP).

The insulating sheet 110 may have a first wing portion 112 and a second wing portion 113 positioned on (e.g., extending from) opposite edges of the seating portion 111. The seating portion 111 may have an area (e.g., a surface area) corresponding to a planar size of the electrode assembly. For example, the seating portion 111 may be in contact with (e.g., may be attached to) the lower surface of the electrode assembly. The wing portions 112 and 113 may be folded upwardly to surround (or cover) the side surface of the electrode assembly while the electrode assembly is seated on the seating portion 111. However, in an embodiment, because the front and rear ends of the electrode assembly are exposed, the electrode uncoated region of each electrode plate (e.g., of each polarity) may be exposed.

An adhesive component is applied to the inner surface of the seating portion 111 and the wing portions 112 and 113, and thus, the insulating sheet 110 may be adhered to an electrode assembly 130 and/or to a retainer 120, which is an internal component.

The retainer 120 may be provided between the seating portion 111 of the insulating sheet 110 and the wing portions 112 and 113. The retainers 120 are provided as a pair and may be respectively disposed on both sides (e.g., opposite sides) of the seating portion 111 of the insulating sheet 110. In addition, the wing portions 112 and 113 of the insulating sheet 110 may be folded upwardly together with the retainer 120 to be erect. For example, the wing portions 112 and 113 may stand up the retainer 120 (e.g., the retainer 120 may be vertically arranged) through bending and, thus, may be respectively coupled to opposite sides of the electrode assembly. The retainer 120 may be coupled to two surfaces of the electrode assembly 130 facing each other having a relatively small area from among the four side surfaces of the electrode assembly 130. Therefore, the retainer 120 can cover the side surfaces of the electrode assembly 130 and protect the side surfaces from being scratched in the process of coupling a case to the outside of the electrode assembly 130, which will be described later, thereby preventing the electrode assembly 130 from being damaged.

The retainer 120 may be made of an electrically insulating material, similar to the insulating sheet 110. The retainer 120 may include polypropylene (PP) or high heat-resistant polyimide (PI). Accordingly, the retainer 120 may protect the side surfaces of the electrode assembly 130 while preventing the side surfaces of the electrode assembly 130 from contacting the case and being short-circuited.

The retainer 120 may have a width that is not less than 1 mm smaller than the width of the short side portion (or short side surface) of the electrode assembly 130. When the retainer 120 has a width that is not less than 1 mm smaller than the width of the short side portion of the electrode assembly 130, even if the retainer 120 flows (e.g., moves on the insulating sheet 110) before or when the insulating sheet 110 is folded to wrap the electrode assembly 130, the width of the retainer 120 may not exceed the width of (e.g., may be extend or protrude beyond) the electrode assembly 130, thereby preventing defects from occurring during the manufacture.

The retainer 120 may not include a separate adhesive material on the inner surface thereof. Accordingly, physical or chemical damage that may occur to the electrode assembly due to an adhesive material on the retainer 120 may be avoided.

Figure 2:
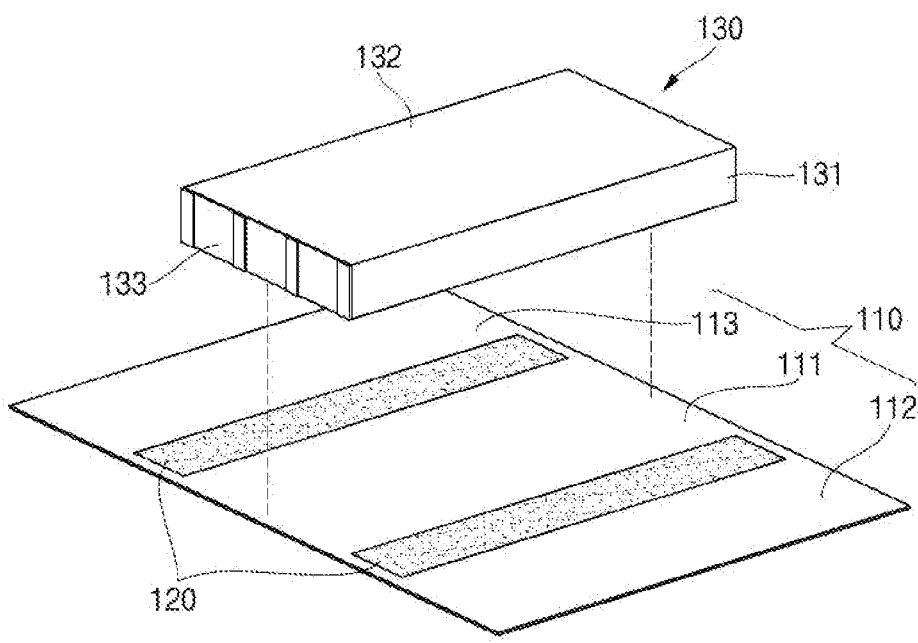
FIG. 2 illustrates a process in which an electrode assembly is seated on the insulating sheet shown in FIG. 1.

FIG. 2 illustrates a process in which the electrode assembly is seated on the insulating sheet shown in FIG. 1.

Referring to FIG. 2, the electrode assembly 130 may be positioned and attached to the seating portion 111 of the insulating sheet 110.

The electrode assembly 130 is formed by stacking a plurality of layers including a first electrode plate, a separator, and a second electrode plate, each having a thin plate shape or a film shape. In one embodiment, the first electrode plate may have a first polarity, for example, a positive electrode, and the second electrode plate may have a second polarity, for example, a negative electrode. However, the present disclosure is not limited thereto, and the first electrode plate and the second electrode plate may have any polarity as long as the first electrode plate and the second electrode plate have different polarities from each other.

The first electrode plate is formed by coating a first electrode active material, such as a transition metal oxide, on a first electrode current collector formed of a metal foil, such as aluminum, and has a first electrode uncoated portion that is a region at where the first active material is not applied. The first electrode uncoated portion provides a passage for current flow between the first electrode plate and the outside.

The first electrode uncoated portions of the first electrode plates may overlap each other at the same position (e.g., at a same end of the electrode assembly 130) when the first electrode plates are stacked. For example, the first electrode uncoated portion protrudes toward one side of the electrode assembly 130, and the electrode plate to be coupled thereafter is combined with the first electrode uncoated portion to have the same polarity as the first electrode plate.

The second electrode plate is formed by coating a second electrode active material, such as graphite or carbon, on a first electrode current collector formed of a metal foil, such as copper or nickel, and the second electrode uncoated portion is a region at where the second active material is not applied.

The second electrode uncoated portions of the second electrode plates may overlap each other at the same position (e.g., at a same end of the electrode assembly 130) when the second electrode plates are stacked. For example, the second electrode uncoated portion protrude toward the other side of the electrode assembly 130 to be coupled to the electrode plate.

The separator is arranged between the first electrode plate and the second electrode plate to prevent short circuit and enable movement of lithium ions. The separator may be made of polyethylene, polypropylene, or a composite film of polyethylene and polypropylene. The present disclosure, however, is not limited by the material of the separator.

The electrode assembly 130 is accommodated inside (e.g., substantially inside) the case together with the electrolyte. The electrolyte may be formed of a lithium salt, such as $LiPF_6$ or $LiBF_4$, in an organic solvent, such as ethylene carbonate (EC), propylene carbonate (PC), diethyl carbonate (DEC), ethyl methyl carbonate (EMC), or dimethyl carbonate (DMC). The electrolyte may be in a liquid, solid or gel phase.

For example, as shown in FIG. 2, the electrode assembly 130 may have a short side portion 131, a long side portion 132, and an electrode uncoated portion 133. From among these portions, the short side portion 131 and the long side portion 132 may form a side surface of the electrode assembly 130, and a region having a relatively small area may be referred as the short side portion 131, and a region having a relatively large area may be referred as the long side portion 132. In addition, electrode uncoated portions 133 may be formed at opposite ends of the electrode assembly 130 to be connected to the respective electrode plates.

In addition, one surface of the long side portion 132 of the electrode assembly 130 may be positioned on the seating portion 111 of the insulating sheet 110 and adhered thereto.

Figure 3:
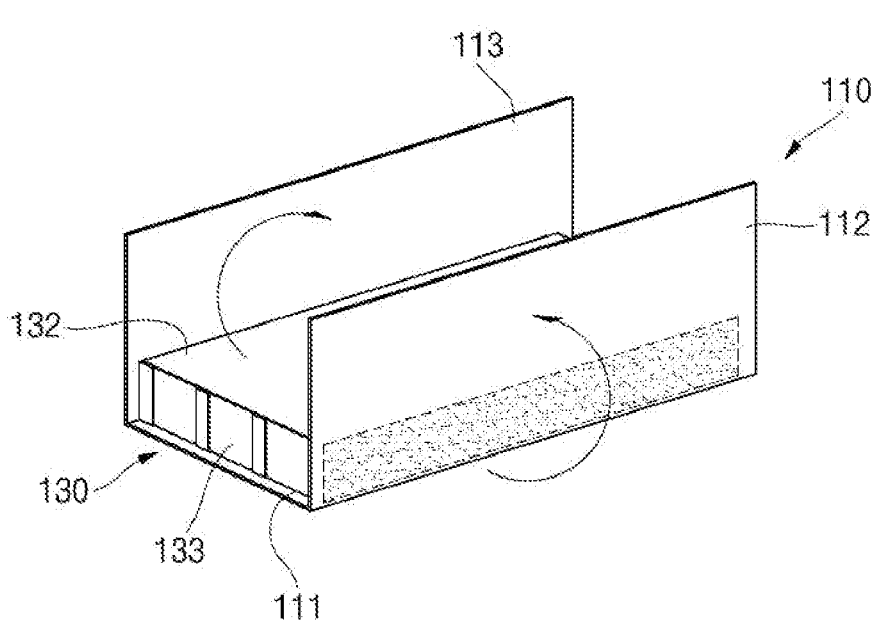
FIGS. 3 to 5 illustrate a folding process of the insulating sheet around the electrode assembly shown in FIG. 2.
Figure 4:
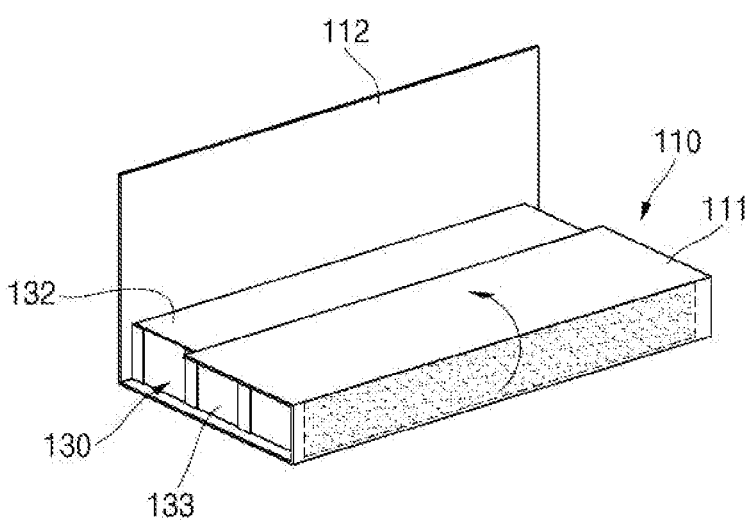
Figure 5:
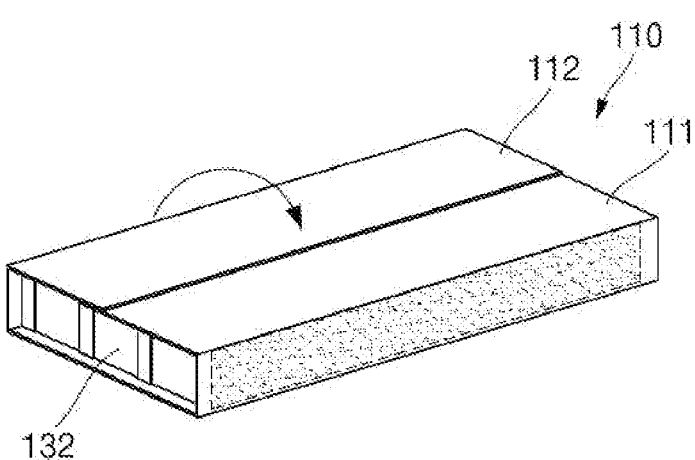

FIGS. 3 to 5 illustrate a folding process of the insulating sheet around the electrode assembly shown in FIG. 2.

First, referring to FIG. 3, the wing portions 112 and 113 of the insulating sheet 110 may be bent along both edges of the side of the electrode assembly 130. For example, the first wing portion 112 may be bent upwardly in a state in which the retainer 120 is provided therein and may be bent upwardly along one edge of the side portion from the lower surface corresponding to the long side portion 132 of the electrode assembly 130. In addition, the second wing portion 113 may be bent upwardly in a state in which the retainer 120 is provided therein and may be bent upwardly along the other edge from the side portion of the lower surface of the electrode assembly 130. Accordingly, as shown in FIG. 3, the retainers 120 may be in contact with both sides of the electrode assembly 130, that is, the two short side portions 131, respectively.

Next, referring to FIG. 4, the first wing portion 112 may be bent once again and attached to surround (or cover) the upper surface of the electrode assembly 130. In an embodiment, the end portion of the first wing portion 112 may extend over ½ or more of the width of the upper surface of the long side portion 132 of the electrode assembly 130. In addition, because the first wing portion 112 are attached to the upper surface of the electrode assembly 130 to have a fixed position, the retainer 120 located inside the first wing portion 112 is fixed to the side surface of the electrode assembly 130.

Next, referring to FIG. 5, the second wing portion 113 may be bent and attached to surround (or cover) the upper surface of the long side portion 132 of the electrode assembly 130. In addition, the second wing portion 113 may extend over ½ or more of the width of the upper surface of the electrode assembly 130. According to this configuration, the end portion of the second wing portion 113 is extends over the upper surface of the long side portion 132 to overlap the first wing portion 112 in an some area. In addition, to the overlapping area of the first wing portion 112 and the second wing portion 113 ensure that the upper surface of the electrode assembly 130 is completely covered. Because the second wing portion 113 is fixed to the upper surface of the electrode assembly 130 by being bent and attached thereto, the retainer 120 located inside the second wing portion 113 may be fixed to the side of the electrode assembly 130.

Figure 6:
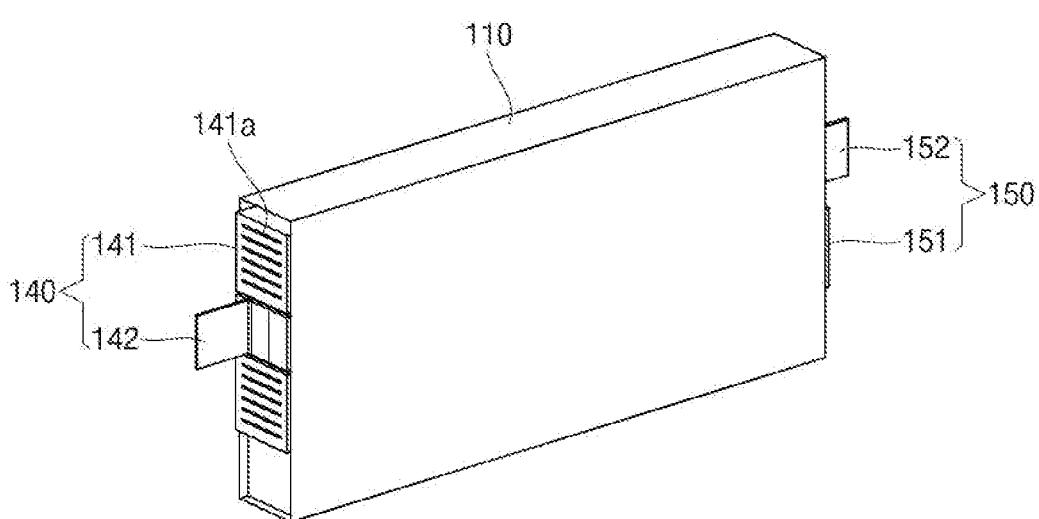
FIG. 6 illustrates a process in which a current collector plate is coupled to the electrode assembly shown in FIG. 5.

FIG. 6 illustrates a process in which a current collector plate is coupled to the wrapped electrode assembly shown in FIG. 5.

Referring to FIG. 6, current collector plates 140 and 150 may be coupled to the front and rear ends of the electrode assembly 130, which are exposed by the insulating sheet 110, respectively. As described above, the electrode assembly 130 includes a first electrode uncoated portion extending from the first electrode plate and a second electrode uncoated portion extending from the second electrode plate, and the first and second electrode uncoated portions may be respectively formed as front and rear ends of the electrode assembly 130. Accordingly, the first current collector plate 140 and the second current collector plate 150 may be coupled to the first electrode uncoated portion and the second electrode uncoated portion not covered by the insulating sheet 110, respectively.

The first current collector plate 140 may include a current collecting portion 141 and a terminal portion 142. The current collecting portion 141 may be coupled by contacting the first electrode uncoated portions of the electrode assembly 130. The current collecting portion 141 may be arranged along the longitudinal direction of the first electrode uncoated portions of the electrode assembly 130 and may have a plurality of welding holes 141a formed in a direction perpendicular to the longitudinal direction of the current collecting portion 141. By irradiating a beam through the welding hole 141a to perform laser welding, the current collecting portion 141 and the first electrode uncoated portions of the electrode assembly may be electrically connected.

The terminal portion 142 may protrude from an area of the current collecting portion 141. The terminal portion 142 may be (e.g., may extend) substantially perpendicular to the current collecting portion 141. Because the terminal portion 142 protrudes from the current collecting portion 141, the structure of the cap assembly can be easily welded thereafter. In addition, after welding, the terminal portion 142 may be bent about 90 degrees to be parallel to the current collecting portion 141, and through the bending operation of the terminal portion 142, the cap assembly may be closely coupled to the opening of the case.

The second current collector plate 150 may similarly include a current collector 151 and a terminal 152. The second current collector plate 150 is coupled to the second current collector uncoated portions of the electrode assembly 130, and the configuration and operation thereof are the same or substantially the same as those of the first current collector plate 140, and thus, a detailed description thereof will be omitted.

Figure 7:
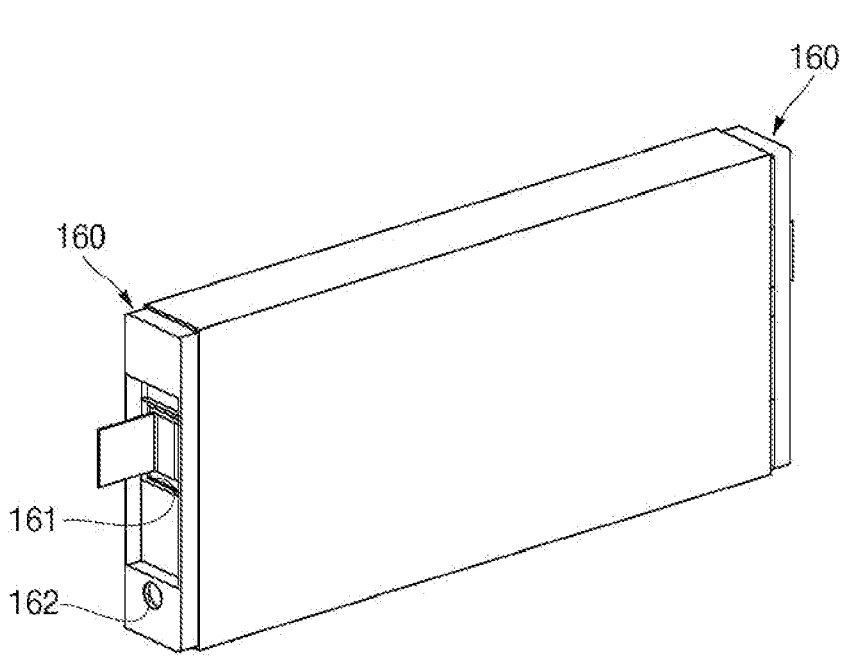
FIG. 7 illustrates a process in which an insulating member is coupled to the electrode assembly shown in FIG. 6.

FIG. 7 illustrates a process in which an insulating member is coupled to the electrode assembly shown in FIG. 6.

Referring to FIG. 7, the insulating member 160 may be coupled from the outside of each of the current collector plates 140 and 150. The insulating member 160 has a terminal hole (e.g., a terminal opening) 161 for exposing the terminal portions 142 and 152 while the current collecting portions 141 and 151 of the current collector plates 140 and 150 are covered from the outside so as not to be exposed. Accordingly, the current collector plates 140 and 150 are located inside the insulating member 160 and are not exposed to the outside, and only the terminal portions 142 and 152 are exposed to the outside through the terminal hole(s) 161.

The insulating member 160 may be made of an electrically insulating material. For example, the insulating member 160 may include polypropylene (PP). Accordingly, the current collector plates 140 and 150 may be electrically independent (e.g., electrically isolated from each other) by the insulating member 160, except at the position where they are welded to the cap assembly, which will be described later. Accordingly, an electrical short circuit does not occur in the secondary battery according to embodiments of the present disclosure.

The insulating member 160 may have an electrolyte injection hole (e.g., an electrolyte injection opening) 162 on one side to provide a path through which an electrolyte is injected into the inside of the case when the electrolyte is injected from the outside through the cap assembly after the coupling is completed.

Figure 8:
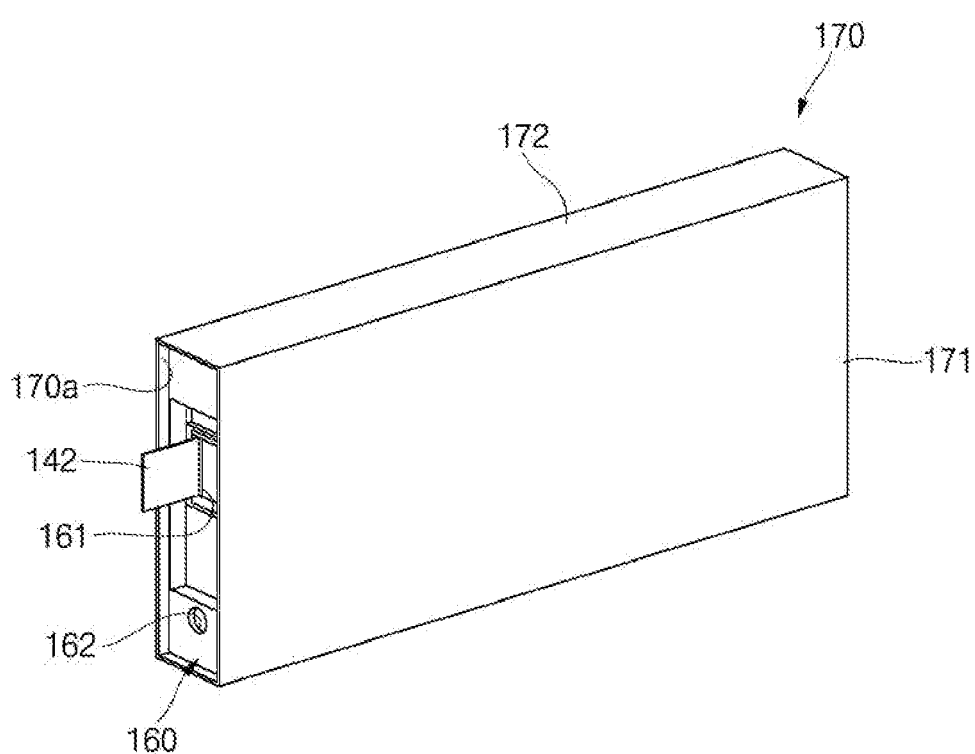
FIG. 8 illustrates a process in which a case is coupled to the insulating sheet structure shown in FIG. 7.

FIG. 8 illustrates a process in which a case is coupled to the insulating sheet used shown in FIG. 7.

Referring to FIG. 8, the case 170 may be coupled to the coupling structure of the insulating sheet 110, the retainer 120, the electrode assembly 130, the current collector plates 140 and 150, and the insulating member 160. The case 170 may be configured as a tube having openings 170a at both ends, and a structure including the electrode assembly 130 may be inserted and coupled through the openings 170a.

As described above, the retainer 120 is coupled to two surfaces of the electrode assembly 130 that face each other with a relatively small area from among the four side surfaces of the electrode assembly 130, and the outside thereof is covered by the insulating sheet 110. In addition, because the side surface of the electrode assembly 130 has a relatively narrow area, the side surface of the electrode assembly are likely to be scratched when the electrode assembly 130 is inserted into the opening 170a of the case 170. However, because the retainer 120 surrounds (or covers) the side surface, the side surface may not be scratched.

Accordingly, when the case 170 is coupled to the electrode assembly 130, damage to the electrode assembly 130 can be prevented.

Figure 9:
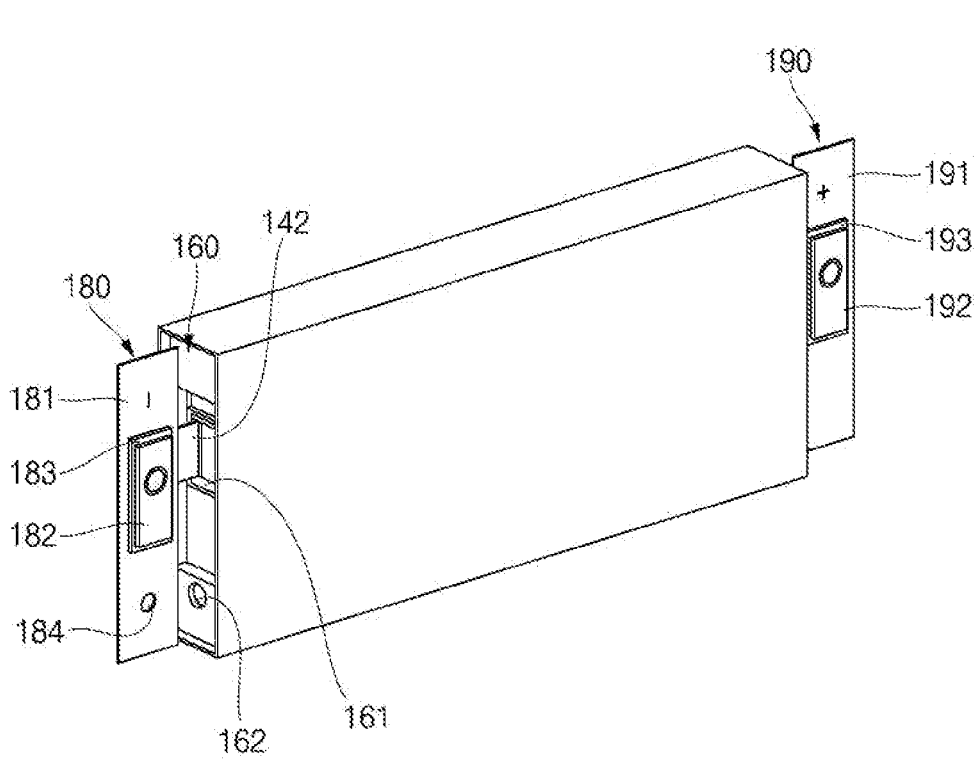
FIG. 9 illustrates a process in which a cap assembly is coupled to the electrode assembly shown in FIG. 8.

FIG. 9 illustrates a process in which cap assemblies is coupled to the electrode assembly shown in FIG. 8.

Referring to FIG. 9, the cap assemblies 180 and 190 may be coupled to the current collector plates 140 and 150, respectively, from the outside of the electrode assembly 130. For example, the terminal portions 142 and 152 of the current collector plates 140 and 150 may be exposed to the outside through the terminal hole (e.g., terminal opening) 161 in the insulating member 160, respectively.

The cap assemblies 180 and 190 may include a first cap assembly 180 coupled to the first current collector plate 140 and a second cap assembly 190 coupled to the second current collector plate 150.

The first cap assembly 180 may include a flat cap plate 181, a terminal plate 182, and an insulating plate 183. The cap plate 181 has a flat plate shape and may have a shape matching the opening 170a in the case 170. In addition, the cap plate 181 may be formed of the same material as the case 170. The terminal plate 182 may be exposed to an upper portion of the cap plate 181 and may be electrically connected to the first current collector plate 140 therein through an electrode terminal penetrating the cap plate 181. In addition, the insulating plate 183 provided on the terminal plate 182 may insulate the terminal plate 182 and the cap plate 181 to be electrically independent from each other. Accordingly, the terminal plate 183 may have the same polarity as the first current collector plate 140 and the first electrode uncoated portion, regardless of the cap plate 181. In addition, an electrolyte injection hole (e.g., an electrolyte injection opening) 184 is formed in the cap plate 181 to provide a path through which an electrolyte is applied from the outside after the cap assembly 180 is assembled.

The second cap assembly 190 may include a flat cap plate 191, a terminal plate 192, and an insulating plate 193 and may be electrically connected to the second current collector plate 150. The configuration and operation of the second cap assembly 190 are similar to those of the first cap assembly 180, and thus, a detailed description thereof will be omitted.

Figure 10:
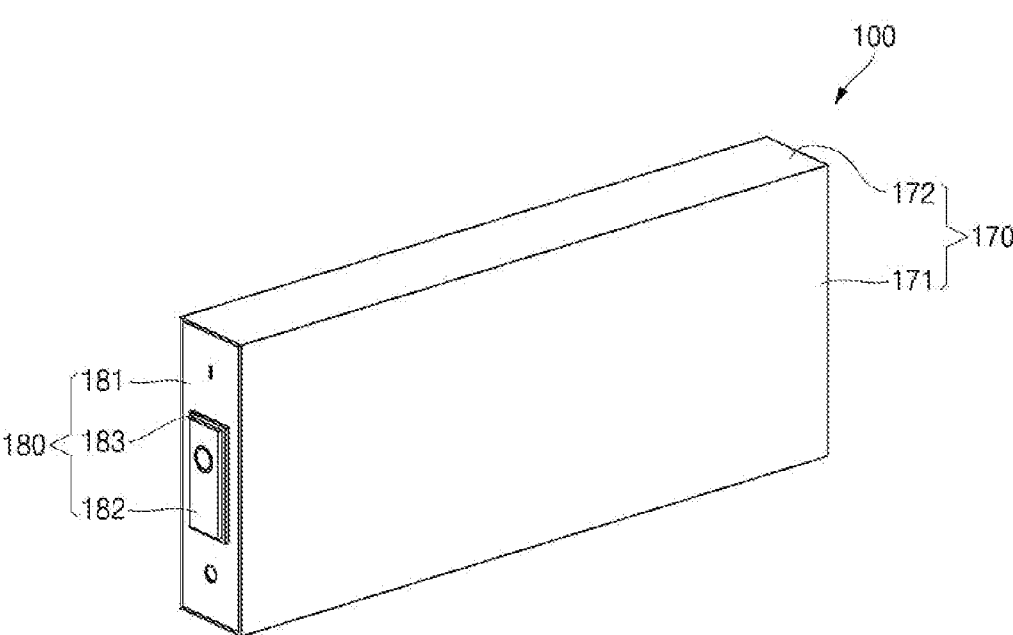
FIG. 10 illustrates a process in which the case and a cap assembly are coupled in the secondary battery shown in FIG. 9.

FIG. 10 illustrates a process in which the case and the cap assembly shown in FIG. 9 are coupled together.

Referring to FIG. 10, after the cap assemblies 180 and 190 are coupled, the terminal portions 142 and 152 of the current collector plates 140 and 150 are bent by about 90 degrees so that the cap plates 181 and 191 can be coupled to the openings 170a in the case 170, respectively. In an embodiment, the terminal plates 182 and 192 may protrude to the outside of the cap plates 181 and 191, respectively.

Then, welding may be performed along the boundaries of the cap plates 181 and 191 and the case 170, respectively. The welding may be laser welding, and accordingly, the inside of the cap plates 181 and 191 and the case 170 may be sealed.

An electrolyte may be injected from the outside through the electrolyte injection hole 184 in the cap plate 181, and then, the electrolyte injection hole 184 may be closed and sealed by a separate injection plug.

In the secondary battery manufactured according to embodiments of the present disclosure, the terminal plates 182 and 192 may be respectively positioned through (or in) both ends of the case 170. Accordingly, lithium ions move through the entire area of the electrode assembly 130, thereby preventing partial (or uneven) deterioration of the electrode assembly 130 and, thus, lifespan and efficiency may be increased.

According to the present disclosure, by attaching an insulating sheet to surround an electrode assembly and a retainer after the retainer is coupled to a short side portion of the electrode assembly, the electrode assembly may not be damaged when the electrode assembly is inserted into a case.

While the foregoing embodiments are some embodiments for carrying out the present disclosure, which is not limited to the embodiments described herein, it will be understood by a person skilled in the art that various changes in form and details may be made therein without departing from the spirit and scope of the present disclosure as defined by the following claims and their equivalents.

What is claimed is:

1. A secondary battery comprising:

an electrode assembly having a long side and a short side;

an insulating sheet surrounding a periphery of the electrode assembly, the insulating sheet having an adhesive on an inner surface thereof;

a retainer between the short side of the electrode assembly and the insulating sheet, the retainer being non-adhesively coupled to the short side of the electrode assembly; and a case accommodating the electrode assembly, the retainer, and the insulating sheet, wherein the insulating sheet is adhered to electrode assembly and the retainer wherein the insulating sheet has a seating portion and wing portions on both sides of the seating portion, wherein a first surface of the long side of the electrode assembly is attached to the seating portion on the insulating sheet, and wherein the wing portions are bent from the seating portion to cover the short side of the electrode assembly and the retainer.

2. The secondary battery of claim 1, wherein a width of the retainer is not less than 1 mm smaller than a width of the short side of the electrode assembly.

3. The secondary battery of claim 1, wherein the retainer and the insulating sheet are made of an electrically insulating material.

4. The secondary battery of claim 1, wherein the insulating sheet comprises polypropylene.

5. The secondary battery of claim 1, wherein the insulating sheet comprises at least one of polypropylene and polyimide.

6. The secondary battery of claim 1, wherein the wing portions of the insulating sheet extend over a second surface of the long side of the electrode assembly to cover the second surface of the long side.

7. The secondary battery of claim 1, further comprising a pair of cap assemblies that are electrically coupled to both ends of the electrode assembly and coupled through both sides of the case.

8. The secondary battery of claim 7, wherein boundaries of the case and the cap assemblies are welded to each other.

9. The secondary battery of claim 1, wherein a width of the retainer is smaller than a width of the short side of the electrode assembly.

10. The secondary battery of claim 6, wherein the wing portions comprise a first wing portion and a second wing portion, and wherein an end portion of the first wing portion extends over $1/2$ or more of the width of the second surface of the long side.

11. The secondary battery of claim 10, wherein an end portion of the second wing portion extends over $1/2$ or more of the width of the second surface of the long side.

12. The secondary battery of claim 11, wherein the first wing portion and the second wing portion overlap.

* * * * *